United States Patent
Chen et al.

(10) Patent No.: US 8,937,460 B2
(45) Date of Patent: Jan. 20, 2015

(54) DUAL-INTERFACE CARD READER MODULE

(75) Inventors: Cheng-Yu Chen, Tainan (TW);
Chih-Ching Chien, Zhubei (TW)

(73) Assignee: Realtek Semiconductor Corp., Hsinchu (TW)

( * ) Notice: Subject to any disclaimer, the term of this patent is extended or adjusted under 35 U.S.C. 154(b) by 368 days.

(21) Appl. No.: 13/465,492

(22) Filed: May 7, 2012

(65) Prior Publication Data
US 2012/0293136 A1 Nov. 22, 2012

(30) Foreign Application Priority Data
May 16, 2011 (TW) .............................. 100117001 A

(51) Int. Cl.
*H02J 7/04* (2006.01)
*H02J 7/16* (2006.01)
*G06F 1/26* (2006.01)

(52) U.S. Cl.
CPC ...................................... *G06F 1/266* (2013.01)
USPC ........................................................ 320/162

(58) Field of Classification Search
CPC .................................. Y02E 60/12; H02J 7/14
USPC ........................................................ 320/162
See application file for complete search history.

(56) References Cited

U.S. PATENT DOCUMENTS

| | | |
|---|---|---|
| 2002/0113574 A1* | 8/2002 | Mashiko ........................ 320/128 |
| 2005/0218228 A1 | 10/2005 | Chang et al. |
| 2011/0215765 A1* | 9/2011 | Shibata et al. ................. 320/134 |

FOREIGN PATENT DOCUMENTS

| | | |
|---|---|---|
| CN | 201122738 Y | 9/2008 |
| TW | M245545 | 10/2004 |
| TW | M377787 U1 | 4/2010 |
| TW | 201019086 A | 5/2010 |

* cited by examiner

*Primary Examiner* — Suresh Memula
(74) *Attorney, Agent, or Firm* — Birch, Stewart, Kolasch & Birch, LLP

(57) ABSTRACT

A dual-interface card reader module is disclosed including: a card accessing circuit; a power controller for providing a charging current to a USB device; an overcurrent detector coupled with the power controller for generating an overcurrent notice when the charging current is greater than a current threshold; and a control circuit coupled with the card accessing circuit and the power controller for accessing a data storage card via the card accessing circuit and instructing the power controller to reduce its electricity output to lower the charging current when receiving the overcurrent notice.

13 Claims, 3 Drawing Sheets

DUAL-INTERFACE CARD READER MODULE

CROSS-REFERENCE TO RELATED APPLICATIONS

This application claims the benefit of priority to Taiwanese Patent Application No. 100117001, filed on May 16, 2011; the entirety of which is incorporated herein by reference for all purposes.

BACKGROUND

The present disclosure generally relates to a card reader module and, more particularly, to a dual-interface card reader module capable of charging a USB device and providing overcurrent protection to the USB device.

In order to extend functionalities and applications, many electronic devices employ some built-in or external hardware modules to access external components. For example, some electronic devices, such as MP3 player, MP4 player, and DVD player, access data, application programs, or multimedia files from external components, such as memory cards or flash memories, through some built-in or external hardware modules, such as a card reader or a USB module.

For portable electronic devices, the efficiency of power utilization is crucial because that the portable electronic device mainly operates by using the limited electricity of the built-in battery in many operating environments. However, the more built-in or external hardware modules the portable electronic device has, the more power consumption the portable electronic device requires. As a result, it is difficult to extend functionalities of an electronic device while maintains high power utilization efficiency for the electronic device.

SUMMARY

An example embodiment of a dual-interface card reader module is disclosed comprising: a card accessing circuit; a power controller for providing a charging current to a USB device connected to the dual-interface card reader module; an overcurrent detector, coupled with the power controller, for generating an overcurrent notice when the charging current is greater than a current threshold; and a control circuit, coupled with the card accessing circuit and the power controller, for accessing a data storage card via the card accessing circuit and for instructing the power controller to reduce its electricity output to lower the charging current when receiving the overcurrent notice.

It is to be understood that both the foregoing general description and the following detailed description are example and explanatory only and are not restrictive of the invention, as claimed.

DETAILED DESCRIPTION

Reference will now be made in detail to embodiments of the invention, which are illustrated in the accompanying drawings. The same reference numbers may be used throughout the drawings to refer to the same or like parts or components.

Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to . . . ." Also, the phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

Figure 1:
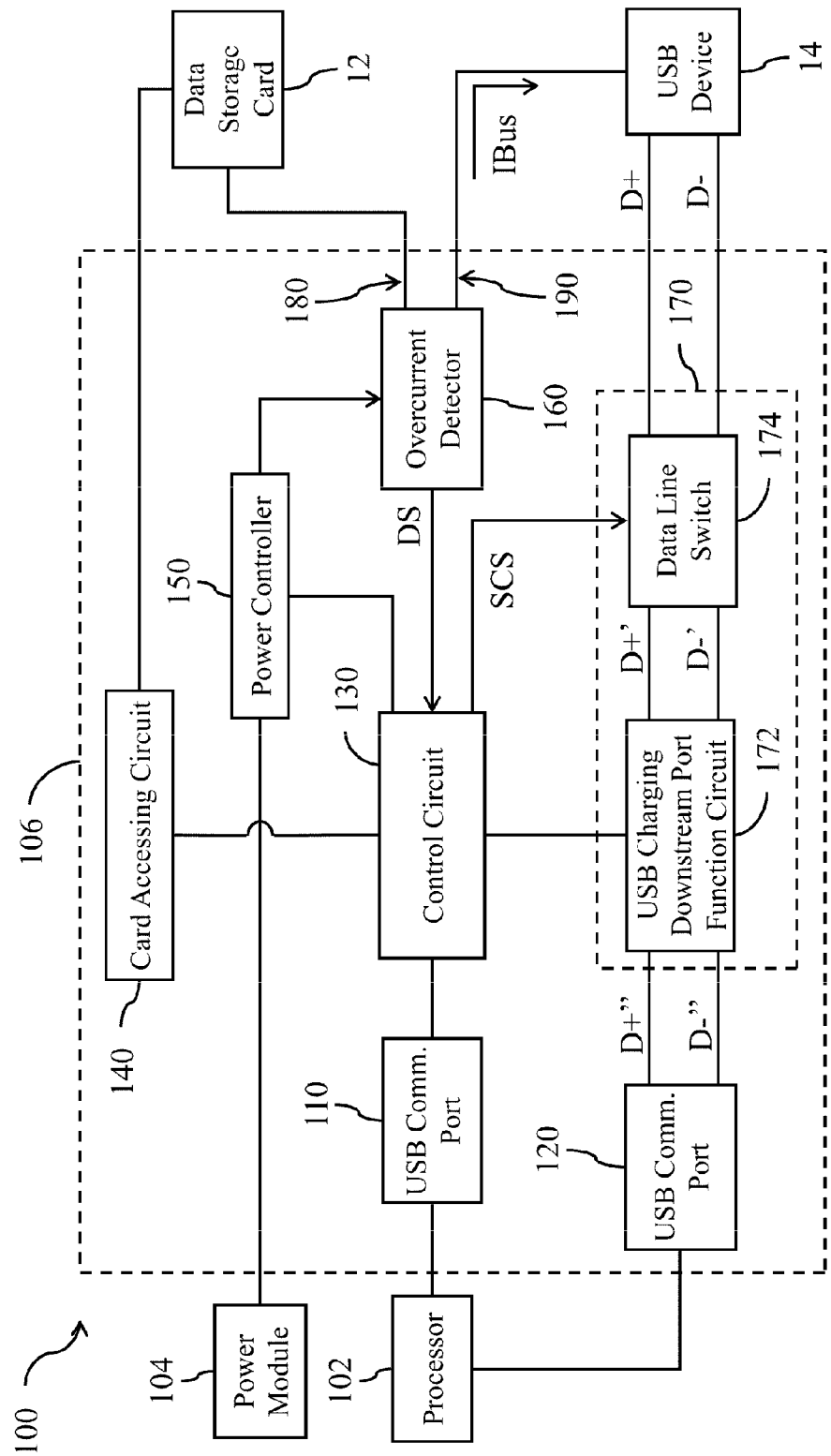
FIG. 1 is a simplified functional block diagram of a portable electronic device in accordance with an example embodiment.

FIG. 1 is a simplified functional block diagram of a portable electronic device 100 in accordance with an example embodiment. The portable electronic device 100 of this embodiment comprises a processor 102, a power module 104, and a dual-interface card reader module 106. Other circuit components of the portable electronic device 100 are usually arranged on a main circuit board of the portable electronic device 100 together with the processor 102. For the purpose of explanatory convenience in the following description, other circuit components of the portable electronic device 100 are omitted herein. The dual-interface card reader module 106 may be positioned on the housing of the portable electronic device 100 to facilitate the user to connect the data storage card 12 and/or a USB device 14 to the dual-interface card reader module 106. In practical applications, the portable electronic device 100 may be a notebook computer, a netbook, a tablet PC, a multimedia player, or other portable electronic devices.

The portable electronic device 100 may connect to the data storage card 12 and the USB device 14 through the dual-interface card reader module 106. In implementations, the data storage card 12 may be a memory card, a SIM card, a smart card, or other card with data storage capability. The USB device 14 may be any electronic device that is capable of communicating with the portable electronic device 100 through the dual-interface card reader module 106 and/or can be charged by the portable electronic device 100. For example, the USB device 14 may be a cell phone, a MP3 player, a voice recorder, and the like. The implementations of the dual-interface card reader module 106 will be further described in the following.

In the embodiment of FIG. 1, the dual-interface card reader module 106 comprises USB communication ports 110 and 120, a control circuit 130, a card accessing circuit 140, a power controller 150, an overcurrent detector 160, and a USB charging port function circuit 170, wherein the card accessing circuit 140, the power controller 150, the overcurrent detector 160, and the USB charging port function circuit 170 are coupled with the control circuit 130. In this embodiment, the USB communication ports 110 and 120, the control circuit 130, the card accessing circuit 140, the power controller 150, the overcurrent detector 160, and the USB charging port function circuit 170 of the dual-interface card reader module 106 are integrated into a single hardware module so that they can be easily assembled to the portable electronic device 100. This not only reduces the manufacturing complexity of the portable electronic device 100, but also increases the convenience of maintenance.

The control circuit 130 is utilized for controlling the operations of the dual-interface card reader module 106. The card accessing circuit 140 is utilized for coupled with the data storage card 12. Depending upon the type of data storage card 12 to be supported by the dual-interface card reader module 106, the card accessing circuit 140 may be a SD (Secure Digital) memory accessing circuit, a SDHC (SD High Capacity) memory accessing circuit, a TF (Trans Flash) memory accessing circuit, or an accessing circuit for other memory cards or smart cards.

The power controller 150 is utilized for receiving electricity from the power module 104 and for supplying electricity to the data storage card 12 via the overcurrent detector 160 and the power supply pin 180, so that circuitry components inside the data storage card 12 can receive required electricity. In addition, the power controller 150 may supply electricity to the USB device 14 via the overcurrent detector 160 and a power supply pin 190, so that the USB device 14 can receive required electricity or a battery inside the USB device 14 can be recharged. In one embodiment, the power module 104 is the battery system of the portable electronic device 100, and the power controller 150 comprises one or more power transistors, such as PMOS transistors or PDMOS (Pseudo-drain MOS) transistors, for adjusting the output voltage or output current of the power controller 150.

In operations, the processor 102 may be coupled with the data storage card 12 via the USB communication port 110 and relevant components of the dual-interface card reader module 106 to access the data storage card 12. For example, the processor 102 may transmit a card reading command to the control circuit 130 of the dual-interface card reader module 106 via the USB communication port 110, so that the control circuit 130 reads data from the data storage card 12 via the card accessing circuit 140 according to the card reading command. In some embodiments where the data storage card 12 has specific computing capability, the control circuit 130 may transmit a control command, received from the processor 102 via the USB communication port 110, to the data storage card 12 via the card accessing circuit 140, so that the data storage card 12 performs corresponding computing and returns computing results to the processor 102 via the dual-interface card reader module 106.

The processor 102 may be coupled with the USB device 14 via the USB communication port 120 and relevant components of the dual-interface card reader module 106 to access the USB device 14. In the embodiment of FIG. 1, the USB charging port function circuit 170 may be coupled with the USB device 14 via a pair of device-end USB data lines D+ and D−, wherein the data lines D+ and D− comply with the relevant standards of USB charging downstream port (CDP) or dedicated charging port (DCP). When the USB device 14 is coupled with the USB charging port function circuit 170, the processor 102 may transmit an accessing command to the control circuit 130 of the dual-interface card reader module 106 via the USB communication port 120 and the USB charging port function circuit 170. Then, the control circuit 130 reads the USB device 14 via the USB charging port function circuit 170 and the data lines D+ and D− according to the accessing command.

The USB charging port function circuit 170 of this embodiment comprises a USB charging downstream port function circuit 172 and a data line switch 174, wherein the USB charging downstream port function circuit 172 complies with relevant standards of the USB charging downstream port. As shown, the USB charging downstream port function circuit 172 is connected to the USB communication port 120 via a pair of host-end data lines D+" and D−" complying with relevant USB data communication standards, and is also connected to the data line switch 174 via data lines D+' and D−' complying with relevant standards regarding the USB charging downstream port.

Figure 2:
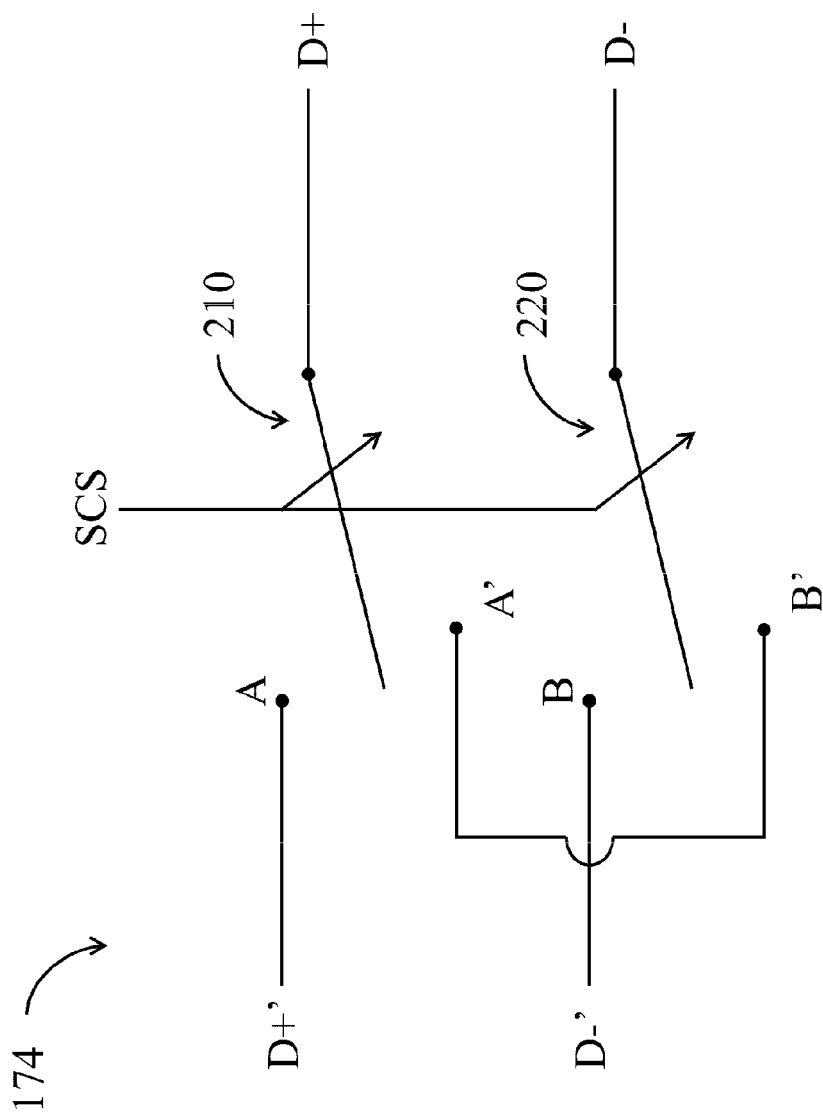
FIG. 2 is a simplified functional block diagram of the data line switch of FIG. 1 in accordance with an example embodiment.

Please refer to FIG. 2, which shows a simplified functional block diagram of the data line switch 174 in accordance with an example embodiment. In this embodiment, the data line switch 174 comprises switches 210 and 220 which operate under the control of a control signal SCS generated from the control circuit 130. When the control circuit 130 respectively switches the switches 210 and 220 to nodes A and B of FIG. 2, the data line switch 174 respectively connects the data lines D+' and D−' to the data lines D+ and D−. In this situation, the function of the data lines D+ and D− complies with the relevant standards regarding the USB charging downstream port. Since the dual-interface card reader module 106 also provides the power supply pin 190 and a grounding line (not shown) to the USB device 14, the dual-interface card reader module 106 functions as a USB charging downstream port complying with relevant USB standards for the USB device 14. Accordingly, the portable electronic device 100 may access the USB device 14 via the dual-interface card reader module 106 and the data lines D+ and D−, or charge the USB device 14 via the power supply pin 190 using an approach complying with relevant standards regarding the USB charging downstream port.

Nodes A' and B' shown in FIG. 2 are a pair of short-circuited nodes. When the control circuit 130 utilizes the control signal SCS to respectively switch the switches 210 and 220 to the nodes A' and B', the data lines D+ and D− are short-circuited. In this situation, the function of the data lines D+ and D− complies with the relevant standards regarding the USB dedicated charging port. Since the dual-interface card reader module 106 also provides the power supply pin 190 and a grounding line (not shown) to the USB device 14, the dual-interface card reader module 106 functions as a USB dedicated charging port complying with relevant USB standards for the USB device 14. Accordingly, the portable electronic device 100 may utilize the dual-interface card reader module 106 to provide a larger current to charge the USB device 14 via and the power supply pin 190 using an approach complying with relevant standards regarding the USB dedicated charging port.

The manufacturer of the dual-interface card reader module 106 or the portable electronic device 100 may preprogram the control circuit 130 to select either the USB CDP mode or the USB DCP mode as a default operation mode of the dual-interface card reader module 106 when the dual-interface card reader module is connected to the USB device 14. In another embodiment, the user of the dual-interface card reader module 106 or the portable electronic device 100 may configure or adjust the default operation mode of the dual-interface card reader module 106 when connected to the USB device 14 through an appropriate application program corresponding to the dual-interface card reader module 106 depending upon the user's demand. That is, the user may configure the dual-interface card reader module 106 as a USB charging downstream port or a USB dedicated charging port when connecting the dual-interface card reader module 106 to the USB device 14 as needed.

When the dual-interface card reader module 106 operates at the USB CDP mode or the USB DCP mode to charge the USB device 14, a charging current IBus supplied by the power controller 150 to the USB device 14 via the overcurrent detector 160 and the power supply pin 190 may be greater than the upper limit 0.5 A of a USB standard downstream port (SDP).

In order to prevent the USB device 14 from being damaged by overcurrent, the dual-interface card reader module 106 of this embodiment may utilize the control circuit 130, the power controller 150, and the overcurrent detector 160 to provide overcurrent protection function. For example, when the overcurrent detector 160 detected that the charging current IBus supplied by the power controller 150 to the USB device 14 exceeds a predetermined current threshold, the overcurrent detector 160 may transmit an overcurrent notice to the control circuit 130. The control circuit 130 may then instruct the power controller 150 to stop or reduce electricity output to prevent the USB device 14 from being damaged by the impact of overcurrent.

Figure 3:
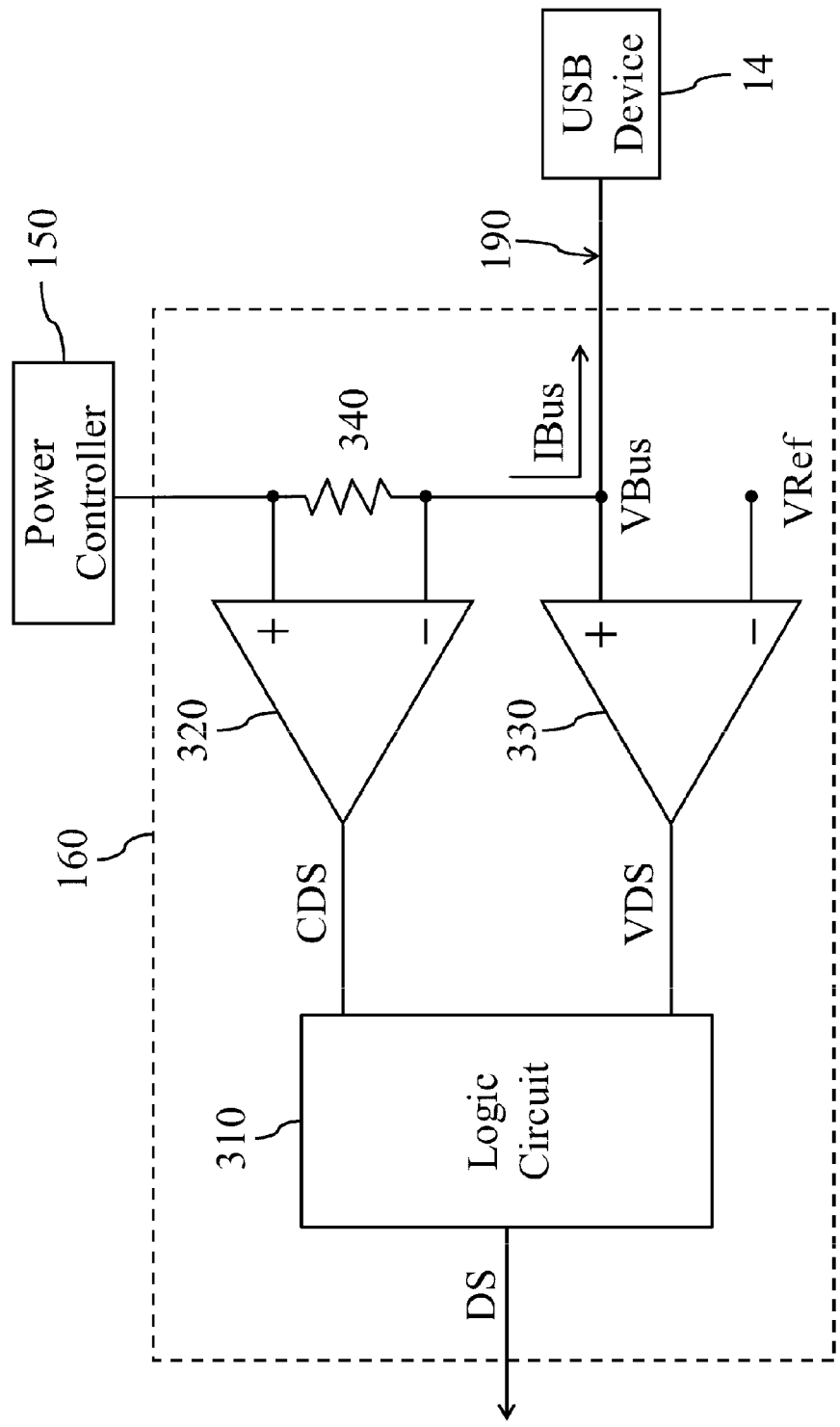
FIG. 3 is a simplified functional block diagram of the overcurrent detector of FIG. 1 in accordance with an example embodiment.

Please refer to FIG. 3, which shows a simplified functional block diagram of the overcurrent detector 160 in accordance with an example embodiment. In this embodiment, the overcurrent detector 160 comprises a logic circuit 310, comparators 320 and 330, and a resistor 340. The resistor 340 is utilized for converting the charging current IBus received by the USB device 14 into a resistor voltage (hereinafter, a voltage V340). The comparator 320 detects whether the voltage V340 is greater than a predetermined voltage threshold VTh to generate a detection signal CDS. The comparator 330 detects whether a charging voltage VBus corresponding to the charging current IBus supplied by the overcurrent detector 160 to the USB device 14 is lower than a predetermined reference voltage VRef to generate a detection signal VDS, wherein the reference voltage VRef may be 5V or less than 5V. The logic circuit 310 is utilized for generating a detection signal DS according to the detection signals CDS and VDS so as to provide the detection result of the overcurrent detector 160 to the control circuit 130.

For example, assuming that the upper limit of acceptable charging current for the USB device 14 is a current threshold ITh, then the voltage threshold VTh is a product of the resistance of the resistor 340 and the current threshold ITh. Accordingly, when the detection signal CDS indicates that the voltage V340 is greater than the voltage threshold VTh, it represents that the charging current IBus received by the USB device 14 at the time exceeds the upper limit of acceptable charging current ITh for the USB device 14. In this situation, the logic circuit 310 may notify the control circuit 130 of the occurrence of overcurrent through the detection signal DS. Then, the control circuit 130 instructs the power controller 150 to stop or reduce output current.

In addition, when the detection signal VDS indicates that the charging voltage VBus of the USB device 14 is lower than the reference voltage VRef, it means that the portable electronic device 100 may be in a power-saving mode, such as in a suspend mode, in a hibernation mode, or is power-off. In this situation, the logic circuit 310 may utilize the detection signal DS to inform the control circuit 130 that the portable electronic device 100 is in a power-saving mode.

In addition to the detection signal DS described previously, the control circuit 130 may determine whether the portable electronic device 100 enters into a power-saving mode according to the status of the USB communication port 110. In some embodiments, when the portable electronic device 100 enters into the power-saving mode, the power module 104 utilizes a backup power source to supply electricity to the dual-interface card reader module 106. In such case, the control circuit 130 of the dual-interface card reader module 106 may instead detect whether the portable electronic device 100 enters into a power-saving mode based on the electricity source of the power controller 150.

When the portable electronic device 100 is in a power-saving mode, the control circuit 130 switches the dual-interface card reader module 106 to a power-saving mode. For example, the control circuit 130 may turn off the operations of some components inside the dual-interface card reader module 106, such as the card accessing circuit 140 and the USB charging downstream port function circuit 172. The control circuit 130 may instruct the power controller 150 to reduce the charging current IBus to be supplied to the USB device 14, so as to reduce the power consumption of the dual-interface card reader module 106 and the USB device 14.

If the dual-interface card reader module 106 of the portable electronic device 100 is replaced by a traditional card reader module and a traditional USB interface module having overcurrent protection circuit, then when the portable electronic device 100 is in a power-saving mode, the power module 104 of the portable electronic device 100 not only needs to provide a standby current (above 500 mA in normal cases) to the traditional card reader module, but also needs to provide an additional standby current (above 500 mA in normal cases) to the traditional USB interface module to enable the operation of the overcurrent protection circuit inside the traditional USB interface module. In comparison with this case, the overcurrent detector 160 disclosed previously has a very compact structure, and thus the power module 104 only needs to provide a standby current of about 300~500 mA to the overcurrent detector 160. Accordingly, when the portable electronic device 100 is in a power-saving mode, the power consumption required for the dual-interface card reader module 106 to provide overcurrent protection for the USB device 14 is about only half or even less than that of the traditional case. When the power module 104 is a battery, the low power consumption advantage of the disclosed dual-interface card reader module 106 effectively extends the power supply duration of the power module 104, and thereby increasing the standby duration of the portable electronic device 100.

As can be seen from the foregoing descriptions, the dual-interface card reader module 106 of the portable electronic device 100 not only extends the functionalities of the portable electronic device 100, but also improves the energy utilization efficiency of the portable electronic device 100.

In another embodiment, the overcurrent detector 160 further monitors the current passing through the power supply pin 180. When the overcurrent detector 160 detected that overcurrent situation occurs on the power supply pin 180, i.e., the operating current supplied by the power controller 150 to the data storage card 12 exceeds a predetermined threshold, the overcurrent detector 160 may transmit an overcurrent notice to the control circuit 130. Then, the control circuit 130 may instruct the power controller 150 to stop or reduce electricity output to prevent components inside the data storage card 12 from being damaged by the overcurrent. In other words, the dual-interface card reader module 106 may simultaneously provide overcurrent protection function to the data storage card 12 and the USB device 14.

In other embodiments, additional power transistor, such as PMOS transistor or pseudo-drain MOS (PDMOS) transistor, may be employed in the power module 104 of the portable electronic device 100 to increase the electricity of the power controller 150, thereby increasing the charging current IBus supplied by the power controller 150 to the USB device 14. In implementations, the power module 104 of the portable electronic device 100 may be a power converter for converting an AC power into a DC power.

In addition, the dual-interface card reader module 106 may be realized by an external hardware module. In such case, USB cables may be employed to connect a USB interface (not shown) of the portable electronic device 100 to the USB communication ports 110 and 120 of the dual-interface card reader module 106, so that the portable electronic device 100 may access the data storage card 12 and the USB device 14 via the dual-interface card reader module 106.

Please note that the previous embodiments where the dual-interface card reader module 106 is applied in a portable electronic device are merely some samples for illustrating the advantage of the disclosed dual-interface card reader module 106, rather than restrictions to the practical application of the dual-interface card reader module 106. For example, the disclosed dual-interface card reader module 106 may be applied in a desktop computer or other electronic device that is normally placed in a certain position, such as a game machine, a set-top box, a smart TV, a smart appliance, or the like, to extend the functionalities of the electronic device and also improve the energy utilization efficiency of the electronic device.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A dual-interface card reader module comprising:
   a card accessing circuit;
   a power controller for providing a charging current to a USB device connected to the dual-interface card reader module;
   an overcurrent detector, coupled with the power controller, for generating an overcurrent notice when the charging current is greater than a current threshold; and
   a control circuit, coupled with the card accessing circuit and the power controller, for accessing a data storage card via the card accessing circuit and for instructing the power controller to reduce its electricity output to lower the charging current when receiving the overcurrent notice.

2. The dual-interface card reader module of claim 1, further comprising:
   a USB charging port function circuit, coupled with the control circuit, for connecting to the USB device via a pair of device-end USB data lines to access the USB device.

3. The dual-interface card reader module of claim 2, wherein the USB charging port function circuit comprises:
   a data line switch; and
   a USB charging downstream port function circuit for connecting to the data line switch via a pair of data lines complying with a USB charging downstream port standard;
   wherein the data line switch is utilized for respectively connecting the pair of device-end USB data lines to the pair of data lines or a pair of short-circuited nodes.

4. The dual-interface card reader module of claim 3, wherein the overcurrent detector comprises:
   a resistor for generating a resistor voltage according to the charging current; and
   a comparator for comparing the resistor voltage and a voltage threshold;
   wherein the voltage threshold is a product of a resistance of the resistor and the current threshold.

5. The dual-interface card reader module of claim 4, further comprising:
   a first USB communication port, coupled with the control circuit, for transmitting a card reading command from a processor to the control circuit, so that the control circuit reads data from the data storage card via the card accessing circuit according to the card reading command; and
   a second USB communication port, coupled with the USB charging port function circuit, for transmitting an accessing command from the processor to the control circuit so that the control circuit reads the USB device via the USB charging port function circuit according to the accessing command.

6. The dual-interface card reader module of claim 5, wherein the control circuit turns off operations of some components of the dual-interface card reader module when an electronic device coupled with the dual-interface card reader module is in a power-saving mode.

7. The dual-interface card reader module of claim 6, wherein the power controller provides an operating current to the data storage card, and the overcurrent detector generates the overcurrent notice when the operating current is greater than a predetermined value.

8. The dual-interface card reader module of claim 6, wherein the first USB communication port and the second USB communication port are to be connected to a USB communication interface of the electronic device via a USB cable so that the electronic device is able to accesses the data storage card and the USB device via the dual-interface card reader module.

9. The dual-interface card reader module of claim 6, wherein the overcurrent detector further compares a reference voltage and a charging voltage corresponding to the charging current, and the control circuit determines whether the electronic device is in a power-saving mode according to the comparing result of the overcurrent detector.

10. The dual-interface card reader module of claim 6, wherein the control circuit determines whether the electronic device is in a power-saving mode according to a status of the first USB communication port.

11. The dual-interface card reader module of claim 6, wherein the control circuit determines whether the electronic device is in a power-saving mode according to the source of electricity of the power controller.

12. The dual-interface card reader module of claim 6, wherein when the electronic device is in a power-saving mode, the overcurrent detector operates by using a standby current supplied by the electronic device to the dual-interface card reader module.

13. The dual-interface card reader module of claim 12, wherein the standby current ranges between 300~500 mA.

* * * * *